United States Patent
Yokoyama

(10) Patent No.: US 10,611,368 B2
(45) Date of Patent: Apr. 7, 2020

(54) METHOD AND SYSTEM FOR COLLISION AVOIDANCE

(71) Applicant: HITACHI, LTD., Tokyo (JP)

(72) Inventor: Atsushi Yokoyama, West Bloomfield, MI (US)

(73) Assignee: HITACHI, LTD., Tokyo (JP)

(*) Notice: Subject to any disclaimer, the term of this patent is extended or adjusted under 35 U.S.C. 154(b) by 138 days.

(21) Appl. No.: 15/673,339

(22) Filed: Aug. 9, 2017

(65) Prior Publication Data

US 2019/0047553 A1 Feb. 14, 2019

(51) Int. Cl.
*B60W 30/09* (2012.01)
*B60W 10/20* (2006.01)
*B60W 30/095* (2012.01)
*G01B 21/16* (2006.01)

(52) U.S. Cl.
CPC ............ *B60W 30/09* (2013.01); *B60W 10/20* (2013.01); *B60W 30/0956* (2013.01); *G01B 21/16* (2013.01); *B60W 2520/06* (2013.01); *B60W 2520/10* (2013.01); *B60W 2550/10* (2013.01); *B60W 2720/10* (2013.01); *B60W 2720/24* (2013.01)

(58) Field of Classification Search
CPC ...... B60W 30/09; B60W 10/18; B60W 10/20; B60W 30/0953; B60W 30/0956; B60W 2520/06; B60W 2520/10; B60W 2550/10; B60W 2720/10; B60W 2720/24; G01B 21/16; G08G 1/165; G08G 1/166
USPC .......................................................... 701/41
See application file for complete search history.

(56) References Cited

U.S. PATENT DOCUMENTS

| | | | |
|---|---|---|---|
| 5,006,988 A | 4/1991 | Borenstein et al. | |
| 8,935,088 B2 | 1/2015 | Matsubara | |
| 2015/0066241 A1* | 3/2015 | Akiyama | B60W 10/18 701/1 |

FOREIGN PATENT DOCUMENTS

| | | |
|---|---|---|
| EP | 1526028 A2 | 4/2005 |
| EP | 1729991 A1 | 12/2006 |
| EP | 2444274 A2 | 4/2012 |
| JP | 2013-77264 A | 4/2013 |
| JP | 2017-10292 A | 1/2017 |

OTHER PUBLICATIONS

Gao, Yiqi, et al., "Spatial Predictive Control for Agile Semi-Autonomous Ground Vehicles" AVEC '12. 6 pages.
Extended European Search Report for related EP Patent Application No. 18187509.7, dated Feb. 1, 2019, in 8 pages.
Notice of Reasons for Refusal, Japanese Office Action for Japanese Patent Application No. 2018-149336, dated Jun. 25, 2019, 9 pages.

* cited by examiner

Primary Examiner — Paula L Schneider
(74) Attorney, Agent, or Firm — Procopio, Cory, Hargreaves & Savitch LLP

(57) ABSTRACT

Example implementations involve systems and methods to control the ego vehicle to trace connected plural curved paths, which are calculated as the movement of the vehicle against vertical repulsive force from straight or curved walls, and connected continuously at the joints, and differentiable by position at the joints. Further, the repulsion force acts as deceleration force and lateral force.

18 Claims, 13 Drawing Sheets

METHOD AND SYSTEM FOR COLLISION AVOIDANCE

BACKGROUND

Field

The present disclosure relates to a control method and system which prevents a vehicle from colliding with obstacles such as road edges, guard rails, curve, other vehicles, and pedestrians while the vehicle is operated either manually (e.g., by drivers) or automatically (e.g., by the system). The present disclosure in particular relates to the path planning and dynamics control for a collision avoidance function.

Related Art

Because collision avoidance control is considered to be a safety critical function, related art systems operate with thresholds and physical reasons to activate the collision avoidance control. One of the simplest path-planning functions for collision avoidance involves two control modes: straight braking and parallel lane change without braking as shown in FIG. 1. Such a related art method is physically understandable by automotive engineers and easier for determining thresholds to start active control. However, such a related art method may not be flexible enough for various kinds of collision scenarios because the method can only be applied to straight road conditions and parallel lane changes. The distance from the control starting position to obstacles can be longer than other methods involving brake forces during a lane change.

In a related art implementation, there is a path search method to solve more complicated scenarios. The related art method sets a plurality of primary paths and a plurality of secondary paths and selects an avoidance line. Such a related art method can determine the avoidance path in more complicated scenarios than straight roads while still being physically understandable by automotive engineers. However, such a related art method also does not consider the braking force, thus the distance from the starting control position to obstacles can be longer than the control with braking force taken into consideration.

In another related art implementation there is MPC (Model Predictive Control) for collision avoidance. Because the MPC can calculate non-linear physical phenomena, this related art method can solve for optimal paths for complicated collision scenarios. If the related art system sets the collision distance as a prior cost function, the distance can be calculated more quickly than with other conditions. However, such results calculated from this related art method can be physically incomprehensible to vehicle engineers because the optimal paths are calculated with non-linear state equations and multiple cost-functions. Thus, it can be difficult for the related art method to define the control position threshold clearly against each obstacle, which can result in the optimal calculation not converging in complex conditions.

SUMMARY

Example implementations are directed to addressing the various kinds of collision scenarios preventing the control method from being physically and mathematically complicated to set control thresholds.

Because the collision avoidance control is a safety critical function, it can be beneficial for the system of the example implementations to set the clear threshold and the physical reasons for control activation. Current related art switching methods between straight braking and parallel lane change maneuvers may not be flexible enough for various kinds of collision, and also can be longer than other related art methods because it does not use any brake force during lane change. Another alternative related art method, such as MPC can be physically incomprehensible to vehicle engineers because the optimal paths are calculated with non-linear state equations and multiple cost functions for each step. Such related art methods can make it difficult to define the control threshold clearly against each of the obstacles.

Example implementations are configured to handle such scenarios involving various types of driving and collision use-cases, through using an understandable and solvable control algorithm on a 2D plane.

Example implementations can involve a system and method to control the ego vehicle to trace a plurality of connected curved paths, which are calculated as the movement of the vehicle through assuming a vertical repulsive force from straight or curved walls, and connected continuously while being differentiable by position at the joints. The repulsive force in example implementations acts for both the deceleration force and the lateral force for the vehicle. Because a 2D force includes a deceleration force, the distance towards a potential collision can be shorter than related art methods that do not utilize deceleration. Because the straight or curved walls can be set on both lateral sides, the common algorithm can be applied to various kinds of collision scenarios including straight deceleration control and curve combinations.

The curved paths can be defined as parabolas or trochoids, which can involve simple geometrical curves wherein the threshold to start control can be determined geometrically. When the two curve paths involve line-symmetric parabolas or trochoids, which are tangent each other, the example implementations system can calculate paths with symmetric geometries.

Since the deceleration force changes continuously at the joints of such curved paths, vehicle motion can be restrained during lateral direction change.

Example implementations described herein can provide highly-reliable and flexible collision avoidance control. Algorithms described herein can be combined with artificial intelligence (AI) based control algorithms and backup against failure, which can facilitate the AI technology to be embedded to the Advanced Driver/Advanced Driver Assistance Systems (AD/ADAS) controller. Such control methods can also be applied for VMC (Vehicle Motion Controller).

Because 2D forces include deceleration forces, the distance toward a collision can be made shorter with example implementations than related art methods that do not involve deceleration. Because the straight or curved walls can be set at any direction, the same algorithm in example implementations can be applied to various kinds of collision scenarios including straight deceleration control and curve combinations.

In example implementations, the curved paths can be defined as parabolas or trochoids, which are simple geometrical curves, wherein the threshold to start control can be determined geometrically. When the two curve paths are designed parts of line-symmetric parabolas or trochoids, which are tangent each other, example implementations can calculate paths with symmetric geometries.

Aspects of the present disclosure include a method, which can involve projecting one or more virtual walls to one or more obstacles detected from sensors of a vehicle, wherein each of the one or more virtual walls is associated with a repulsive force; for the vehicle being within a threshold distance to a virtual wall of the one or more virtual walls and at a trajectory determined to collide with the virtual wall of the one or more virtual walls: deriving a lateral force and a longitudinal force from the repulsion force of the virtual wall of the one or more virtual walls on the vehicle; determining steering control for the vehicle from the lateral force; determining deceleration control for the vehicle from the longitudinal force; and engaging controls of the vehicle based on the steering control and the deceleration control.

Aspects of the present disclosure include a non-transitory computer readable medium, storing instructions which can involve projecting one or more virtual walls to one or more obstacles detected from sensors of a vehicle, wherein each of the one or more virtual walls is associated with a repulsive force; for the vehicle being within a threshold distance to a virtual wall of the one or more virtual walls and at a trajectory determined to collide with the virtual wall of the one or more virtual walls: deriving a lateral force and a longitudinal force from the repulsion force of the virtual wall of the one or more virtual walls on the vehicle; determining steering control for the vehicle from the lateral force; determining deceleration control for the vehicle from the longitudinal force; and engaging controls of the vehicle based on the steering control and the deceleration control.

Aspects of the present disclosure include a system, which can involve means for projecting one or more virtual walls to one or more obstacles detected from sensors of a vehicle, wherein each of the one or more virtual walls is associated with a repulsive force; for the vehicle being within a threshold distance to a virtual wall of the one or more virtual walls and at a trajectory determined to collide with the virtual wall of the one or more virtual walls: means for deriving a lateral force and a longitudinal force from the repulsion force of the virtual wall of the one or more virtual walls on the vehicle; means for determining steering control for the vehicle from the lateral force; means for determining deceleration control for the vehicle from the longitudinal force; and means for engaging controls of the vehicle based on the steering control and the deceleration control.

Aspects of the present disclosure include an on board computer (OBC) for a vehicle, which can involve a processor, configured to project one or more virtual walls to one or more obstacles detected from sensors of the vehicle, wherein each of the one or more virtual walls is associated with a repulsive force; for the vehicle being within a threshold distance to a virtual wall of the one or more virtual walls and at a trajectory determined to collide with the virtual wall of the one or more virtual walls, derive a lateral force and a longitudinal force from the repulsion force of the virtual wall of the one or more virtual walls on the vehicle; determine steering control for the vehicle from the lateral force; determine deceleration control for the vehicle from the longitudinal force; and engage controls of the vehicle based on the steering control and the deceleration control.

Aspects of the present disclosure include a vehicle, which can involve a plurality of sensors; and a processor, configured to project one or more virtual walls to one or more obstacles detected from the plurality of sensors, wherein each of the one or more virtual walls is associated with a repulsive force; for the vehicle being within a threshold distance to a virtual wall of the one or more virtual walls and at a trajectory determined to collide with the virtual wall of the one or more virtual walls, derive a lateral force and a longitudinal force from the repulsion force of the virtual wall of the one or more virtual walls on the vehicle; determine steering control for the vehicle from the lateral force; determine deceleration control for the vehicle from the longitudinal force; and engage controls of the vehicle based on the steering control and the deceleration control.

DETAILED DESCRIPTION

Figure 1:
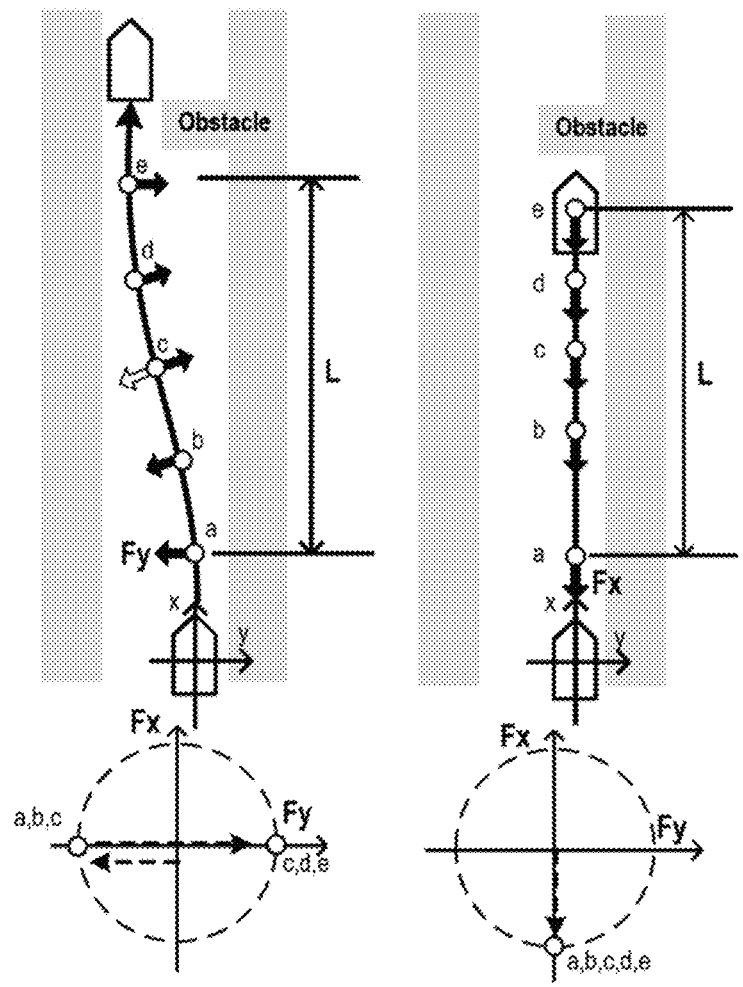
FIG. 1 illustrates a parallel lane change or straight brake control, in a related art implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 2:
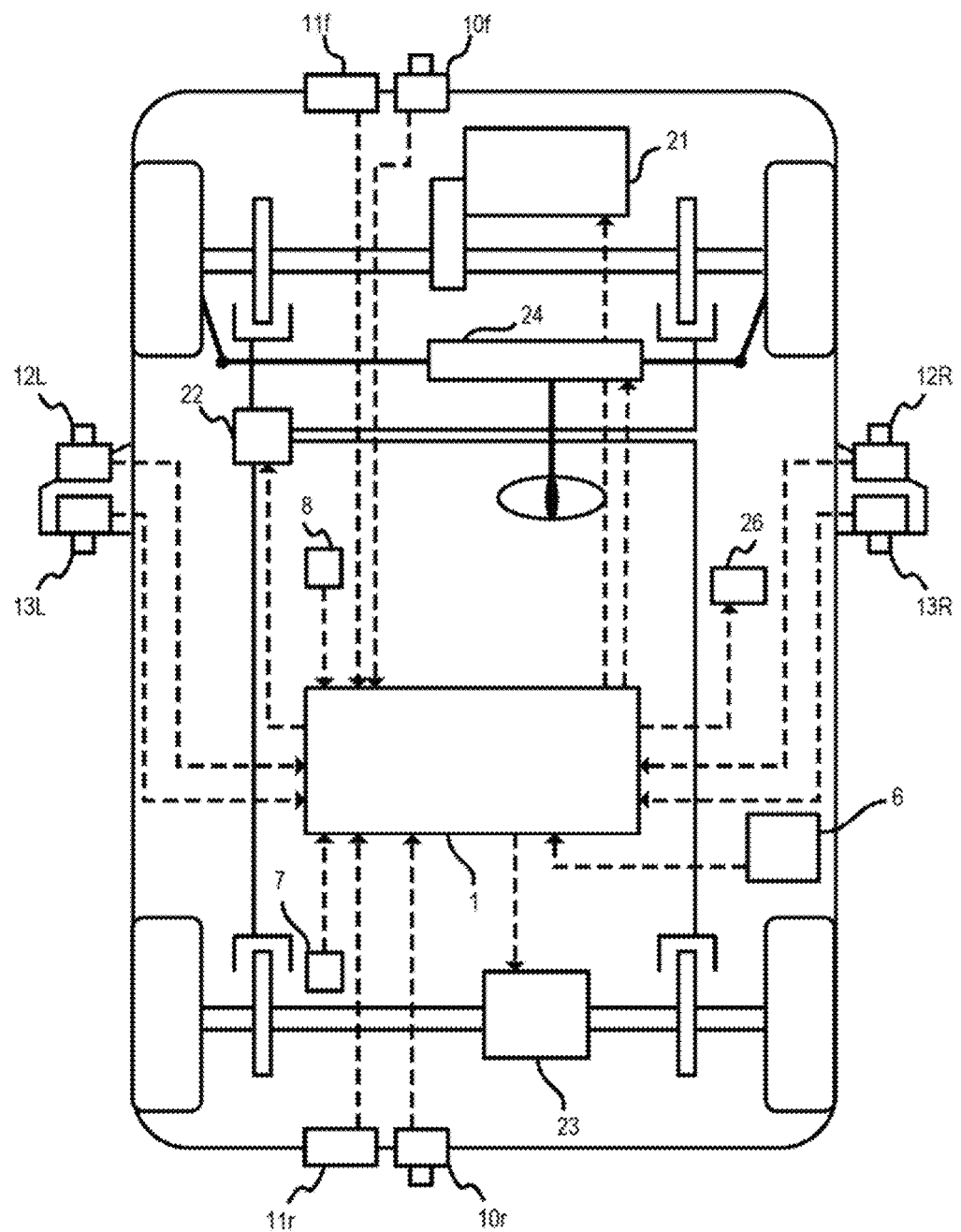
FIG. 2 illustrates a vehicle provided with collision avoidance system, in accordance with an example implementation.

FIG. 2 illustrates a vehicle provided with collision avoidance system, in accordance with an example implementation. The controller 1 is connected to a map system 6 to receive signals from the map system 6. Those signals represent a set route, map data, the position of the vehicle on a map, the direction of the vehicle, lane information, such as the number of lanes, speed limit, and types of roads (i.e., highways and general motorways, and branch roads). The map system 6 may set or change a route automatically on the basis of past data on traveling routes and traffic information.

The vehicle is provided with an operation parameter measuring unit for measuring values of parameters indicating the operating condition of the vehicle, including wheel speed measuring device 7, and vehicle behavior measuring device 8. Signals provided by those devices are sent to the controller 1. The vehicle behavior measuring device 8 measures longitudinal acceleration, lateral acceleration and yaw rate.

The vehicle is provided with environmental condition measuring devices for measuring conditions of the environment around the vehicle, including a front camera 10*f*, a front radar 11*f*, a rear camera 10*r*, a rear radar 11*r*, a left front camera 12L, a right front camera 12R, a left rear camera 13L and a right rear camera 13R. Those environmental condition measuring devices send information about lane marks and obstacles around the vehicle to the controller 1.

The front camera 10*f* is provided with an image pickup unit for obtaining an image of a scenery around the vehicle, a lane identifying unit for identifying lanes on the basis of lane marks or road boundaries shown in an image obtained by the image pickup unit, and an output unit that provides signals representing the positional relation between the vehicle and objects of recognition, such as obstacles including other vehicles and pedestrians, types of lane marks, and types of road boundaries. The lane marks are marks indicating running areas according to traffic rules, including lines, cat's eyes, pot dots, colors of lines, and types of lines (e.g., such as continuous lines, broken lines, dotted lines and shaded lines). Road boundaries include edges of road shoulders, side ditches, curbs, banks, guard rails and walls. The lane marks indicate boundaries between areas for vehicles and those not for vehicles.

The front radar 11*f* detects and locates other vehicles and pedestrians and provides signals representing positional relation between the vehicle and those objects. The front radar 11*f* can detect remote obstacles more accurately than the front camera 10*f*. The front camera 10*f* has a detection field angle greater than that of the front radar 11*f* and can recognize the type of obstacles. The rear camera 10*r*, the left front camera 12L, the right front camera 12R, the left rear camera 13L and the right rear camera 13R are similar in functions, advantages and disadvantages to the front camera 10*f*, and the front radar 11*f* and the rear radar 11*r* are similar in functions, advantages and disadvantages.

The vehicle is provided with an engine 21, an electronically controlled brake system 22, an electronically controlled differential mechanism 23, and an electronically controlled steering system 24. The controller 1 gives drive signals to actuators included in those systems 22, 23 and 24 on the basis of values of manipulated variables given by the driver and environmental conditions. When the vehicle needs to be accelerated, the controller 1 gives an acceleration signal to the engine 21. When the vehicle needs to be decelerated, the controller gives a deceleration signal to the electronically controlled brake system 22. When the vehicle needs to be turned, the controller 1 gives a turn signal to at least one of the electronically controlled brake system 22, the electronically controlled differential mechanism 23 and the electronically controlled steering system 24.

The electronically controlled brake system 22 is a hydraulic brake system capable of controlling individual braking forces respectively applied to the wheels. The electronically controlled brake system applies braking forces to either the right wheels or the left wheels in response to a turning request to apply a yawing moment to the vehicle. The electronically controlled differential mechanism 23 drives an electric motor or a clutch to generate a torque difference between the right and the left axle in response to a turning request to apply a yawing moment to the vehicle. The electronically controlled steering system 24 is, for example, a steer-by-wire steering system capable of correcting the steering angle independently of the turning angle of the steering wheel in response to a turning request to apply a yawing moment to the vehicle.

The vehicle is provided with an information output unit 26. The information output unit 26 displays images, generates sounds and turns on warning lights representing information about supporting operations according to the type of the driving support operation. The information output unit 26 is, for example, a monitor provided with a built-in loud speaker. Plural information output units may be installed in the vehicle.

Figure 3:
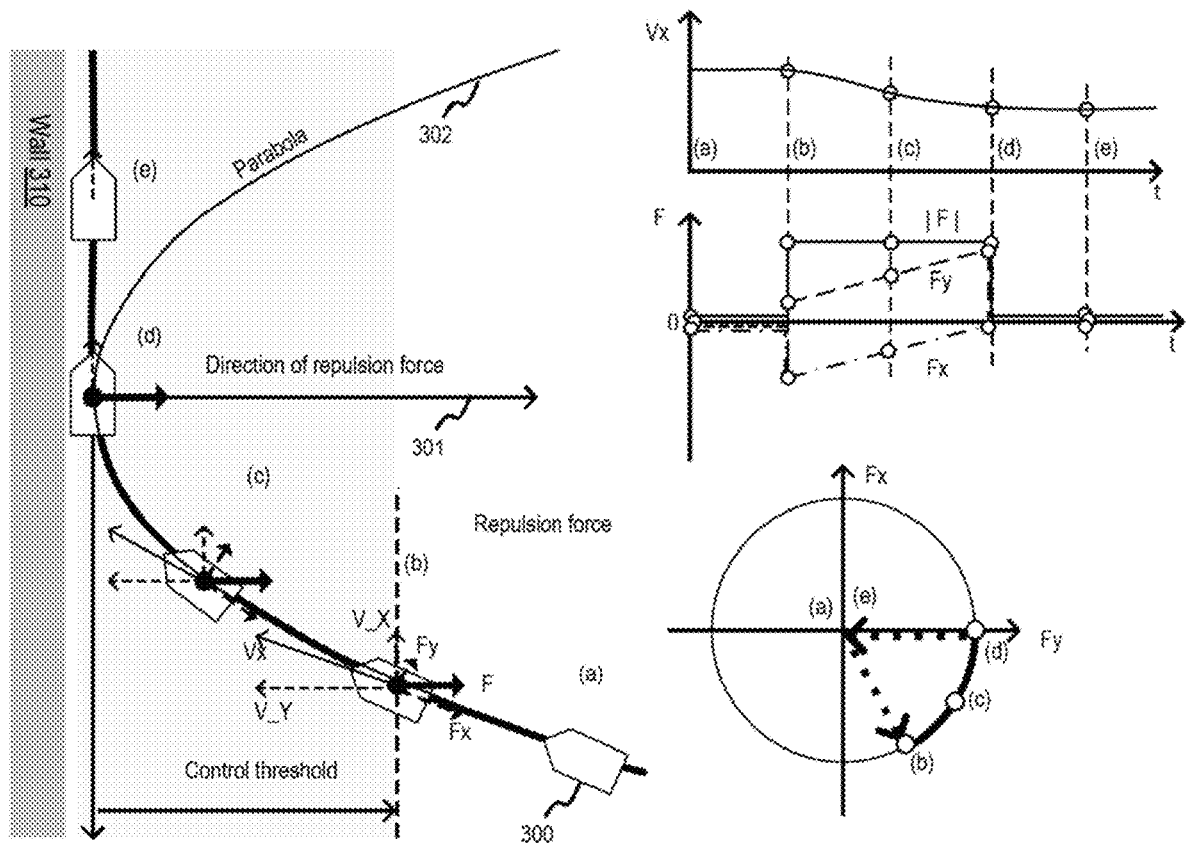
FIG. 3 illustrates a basic collision avoidance control with repulsion force from virtual wall, in accordance with an example implementation.

FIG. 3 illustrates a basic collision avoidance control with repulsion force from a virtual wall 310, in accordance with an example implementation. FIG. 3 illustrates an example use-case wherein a vehicle 300 approaches a virtual wall 310 which is not to be touched. In example implementations, the virtual wall 310 is projected by the vehicle 300. While the position of the vehicle is within the control threshold, the repulsion force 301 from the virtual wall 310 to the vehicle 300 is activated as shown from point (b) to point (d). Because the repulsion force is perpendicular against the wall, deceleration force Fx and lateral force Fy are generated to the vehicle. The repulsive force reduces the velocity component V_Y which is component toward the wall, but repulsive force does not reduce the velocity component V_X which is component parallel to the wall. When the total absolute force F from virtual wall is constant, the traced curve-path can be a parabola 302.

After Fx and Fy are activated at the start point of control, Fx decreases and Fy increases gradually. At the end of control, Fx is zero, Fy is the same value as the constant absolute force. Thus, the 2D force direction changes along the 2D force circle. In this case, the control threshold position against virtual wall can be calculated following equation.

$$D=(V\_Y)^2/(2F/m),$$

where m is mass of the vehicle.

As mentioned above, when a vehicle is controlled based on the repulsive force from wall, the control threshold position can be calculated clearly and geometrically. For the vehicle, the repulsive force is multi-directional force which includes longitudinal and lateral forces. Theoretically, the repulsion force control can minimize the distance between the wall and threshold position when the absolute force is constant. The vehicle can also be safe for collision against walls because the kinetic energy decreases due to deceleration force. Furthermore, the force direction change from back to side can be natural for the drivers because the drivers usually turn their cars after decelerating.

FIGS. 4(*a*) to 4(*d*) illustrate examples of repulsive force control, in accordance with an example implementation. This collision avoidance control method assumes the virtual wall and the repulsive force can cover the various kinds of scenarios from straight braking to gradual approach toward walls. In the case of straight baking as illustrated in FIG. 4(*a*), the same formula as the other conditions to calculate the position threshold L can be applied. In the cases of gradual approach towards walls, the formulas as described in FIG. 3 can be applied to determine the curved path as illustrated in FIGS. 4(b) and 4(c).

Figure 4A:
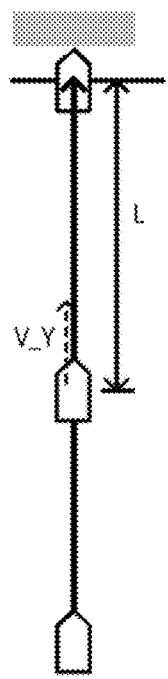
FIGS. 4(a) to 4(d) illustrate examples of repulsive force control, in accordance with an example implementation.
Figure 4B:
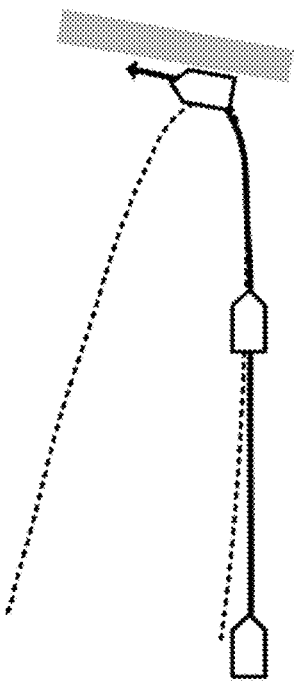
Figure 4C:
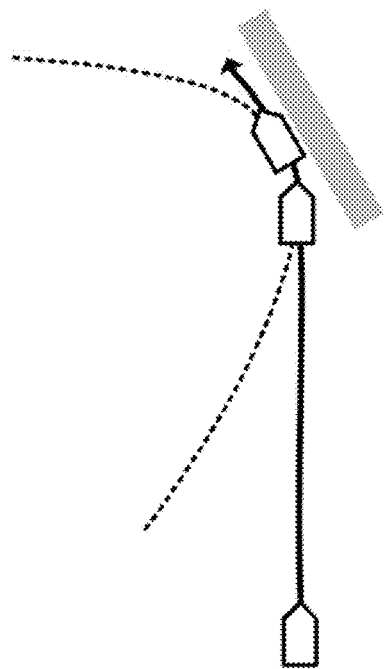
Figure 4D:
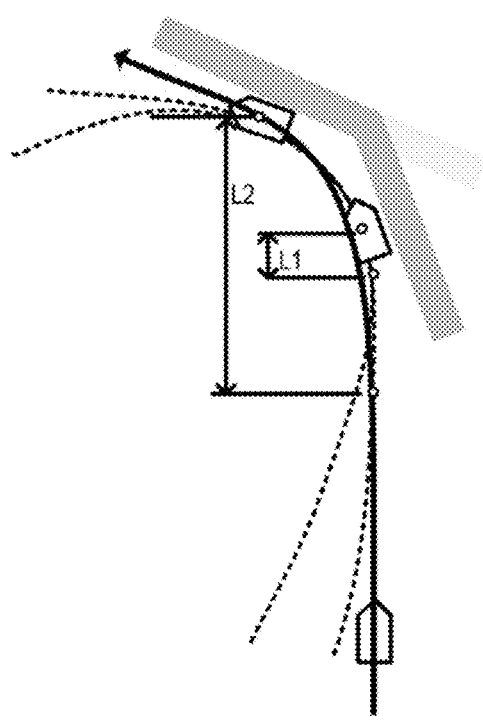

If the controller detects a plurality of walls with varying angles as illustrated in FIG. 4(d), example implementations calculate control path and threshold for each of the walls. The controller selects the nearest threshold position from current position as illustrated in FIG. 4(d).

Through such example implementations, the control method with virtual walls and repulsive forces can prevent vehicles from colliding with not only side obstacles but straight forward obstacles.

Figure 5:
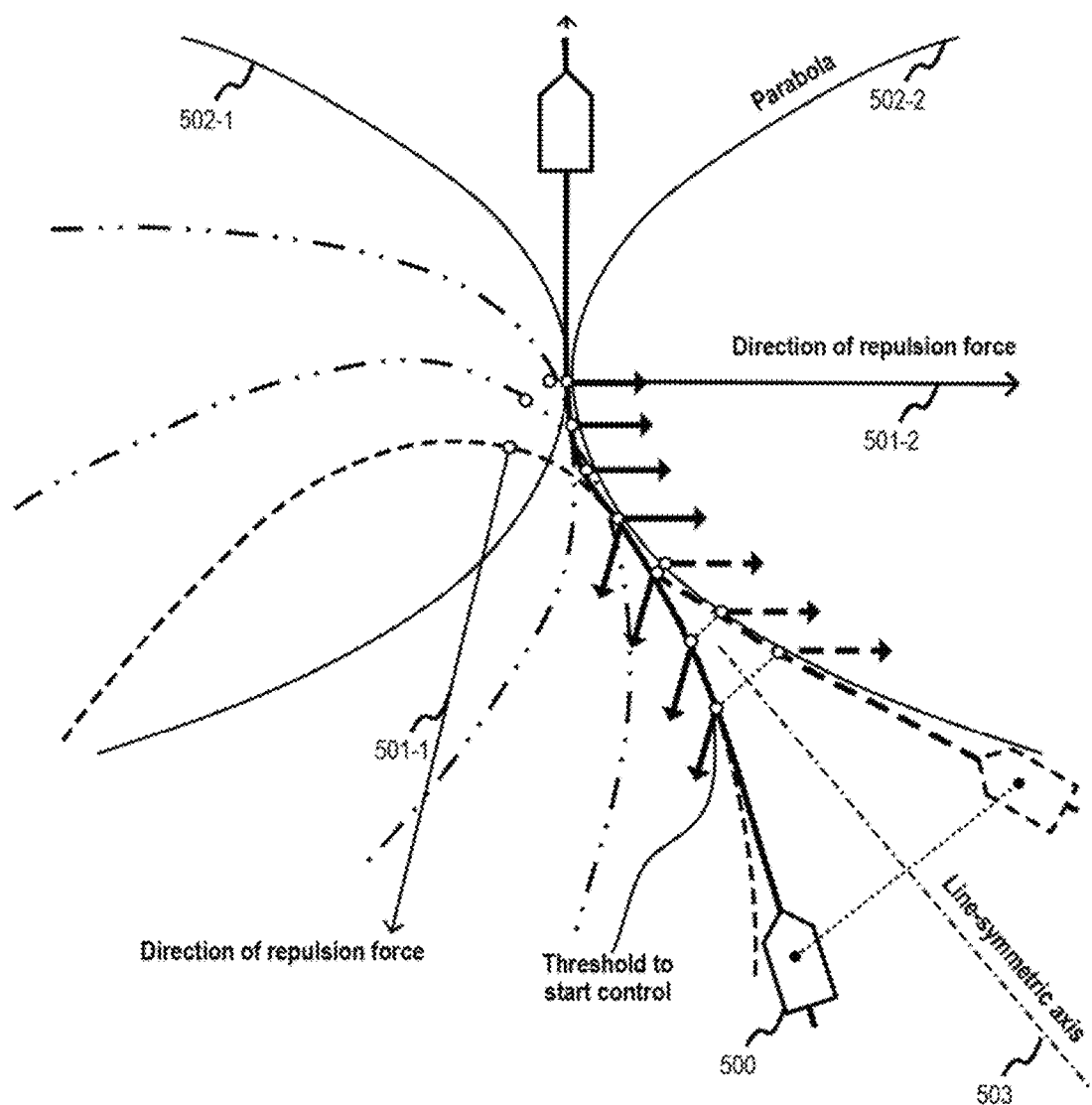
FIG. 5 illustrates an application to two-directional repulsive force in accordance with an example implementation.

FIG. 5 illustrates an application to two-directional repulsive force 501-1, 501-2, in accordance with an example implementation. If a vehicle has to change the lateral directions quickly, the two-directional repulsive force 501-1, 501-2, and the two line-symmetric and tangent parabolic paths 502-1, 502-2, are applied. When the vehicle 500 trace shifts the path from one parabola to another parabola, which are line-symmetric and tangent to each other, the movement of the vehicle 500 changes continuously except for the direction of the repulsive force and acceleration. Thus, the velocity of the vehicle changes from the beginning to the end of control as if the vehicle traces one parabola.

The controller can thereby calculate the threshold position and speed profile using the symmetric relation and deriving the line-symmetric axis 503. The aspect ratio of the parabola depends on the velocity and the direction and tangent point are depends on the two repulsive forces.

Figure 6:
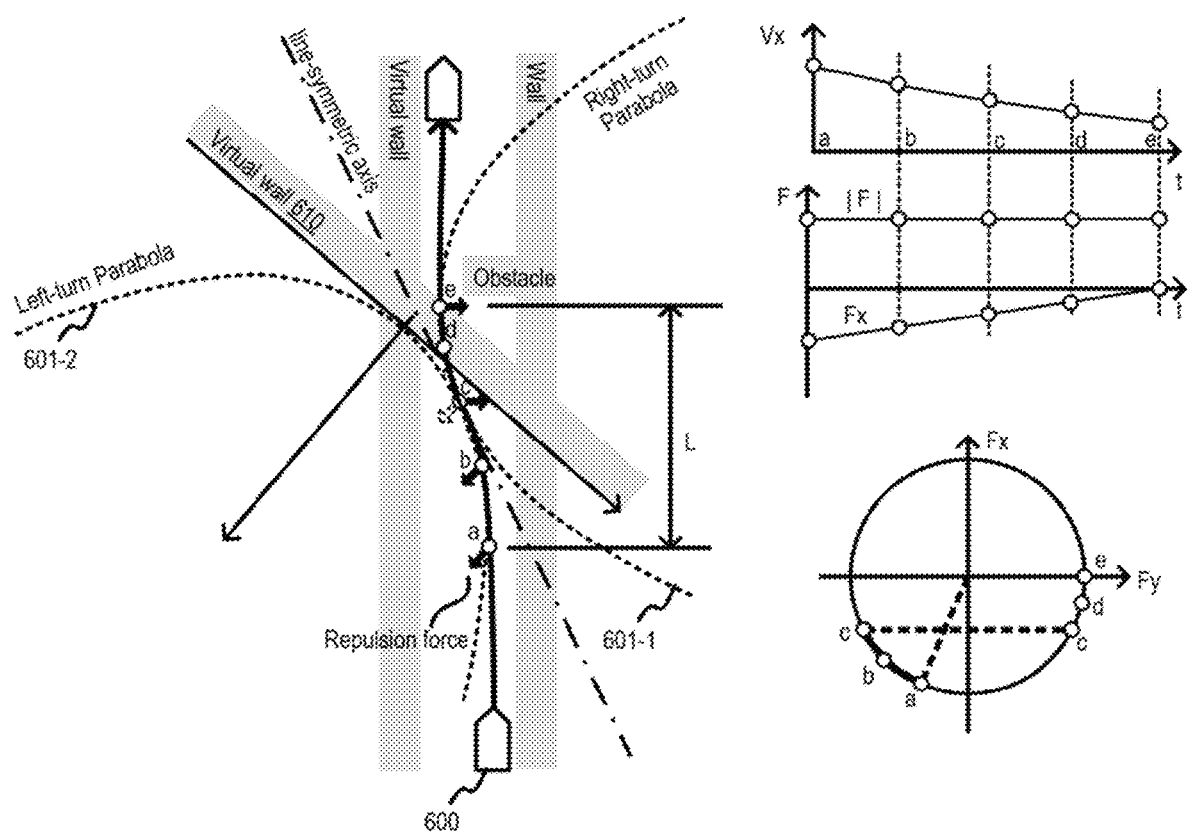
FIG. 6 illustrates an emergent lane change using two directional repulsive forces, in accordance with an example implementation.

FIG. 6 illustrates an emergent lane change using two directional repulsive forces, in accordance with an example implementation. The control method for emergent lane change is shown in FIG. 6, which illustrates typical use cases for using two directional repulsive forces. If the ego vehicle 600 detects an obstacle ahead and finds the exit point (e), the controller designs the right-turn 601-1 and left-turn 601-2 parabolas. The virtual wall 610 of the right-turn parabola 601-1 can be designed to connect the two parabolas symmetrically and the velocity of starting control point is equal to the current approaching speed. The tangent point of the current moving line and left-turn parabola can be the threshold of the collision avoidance control.

After Fx and Fy are activated at the start point of control, Fx decreases gradually. At the end of control, Fx is zero, and Fy is the same value as the constant absolute force. Thus, the 2D force direction changes along the 2D force circle. At the 2D directional changing point from left to right at point (c), the deceleration keeps the same value. Therefore, the motion of vehicle does not change drastically and the motion of driver and passengers can be prevented.

The vehicle can be safe for collision against walls because the kinetic energy decreases due to the deceleration force. Due to the control with deceleration, the distance between the threshold point and exit point can be shorter than the control with only lateral force.

Figure 7A:
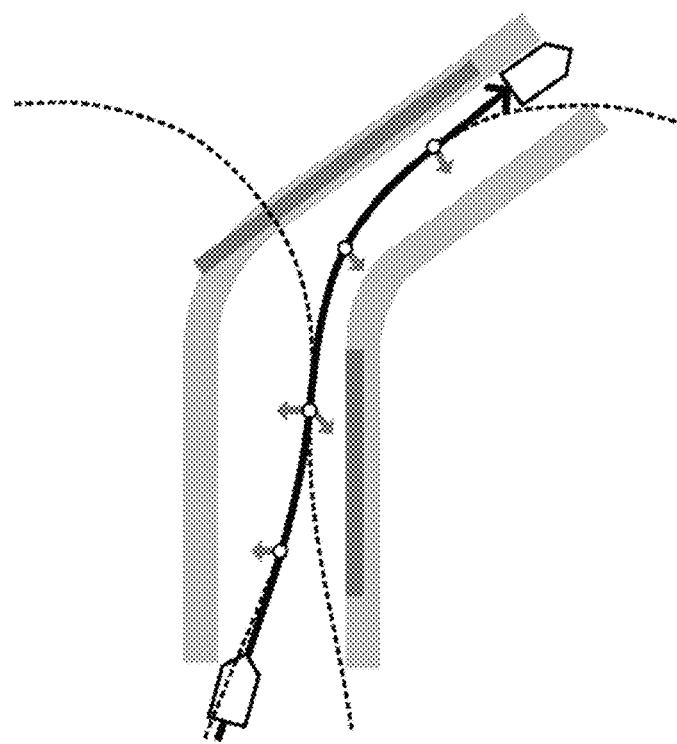
FIGS. 7(a) and 7(b) illustrate applications of two-directional collision avoidance, in accordance with an example implementation.
Figure 7B:
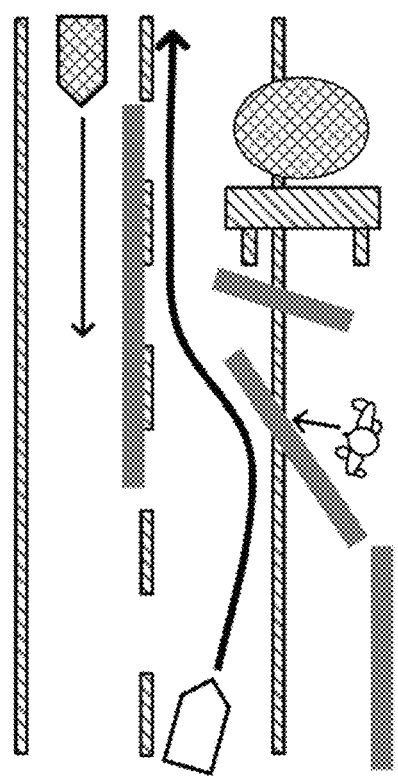

FIGS. 7(a) and 7(b) illustrate applications of two-directional collision avoidance, in accordance with an example implementation. In the example of FIG. 7(a), if there are a wall on the right side and a wall ahead on the left side, it may be insufficient for the vehicle to avoid the first wall. After the vehicle evades the first left wall, the vehicle may hit the second left wall. In this case, the system performs calculations to avoid collision against the second wall and creates the left-turn path which can be connected to the second right-turn. The threshold point to start control will be earlier than the threshold for control just against first right wall.

In the example of FIG. 7(b), if there are miscellaneous obstacles which are not solid walls, the system projects virtual walls against each of the obstacles. The system selects the most critical obstacles for the virtual walls and calculates the path and threshold to avoid collision with these virtual walls. For example, if the system detects a pedestrian crossing the road, a road construction area, and/or an approaching vehicle on opposite lane, it projects virtual walls against each of the obstacles and generates the path including two-directional control paths.

Through such example implementations, virtual walls can be utilized as a solution that is flexible and applicable to miscellaneous obstacles and complicated road conditions.

Figure 8:
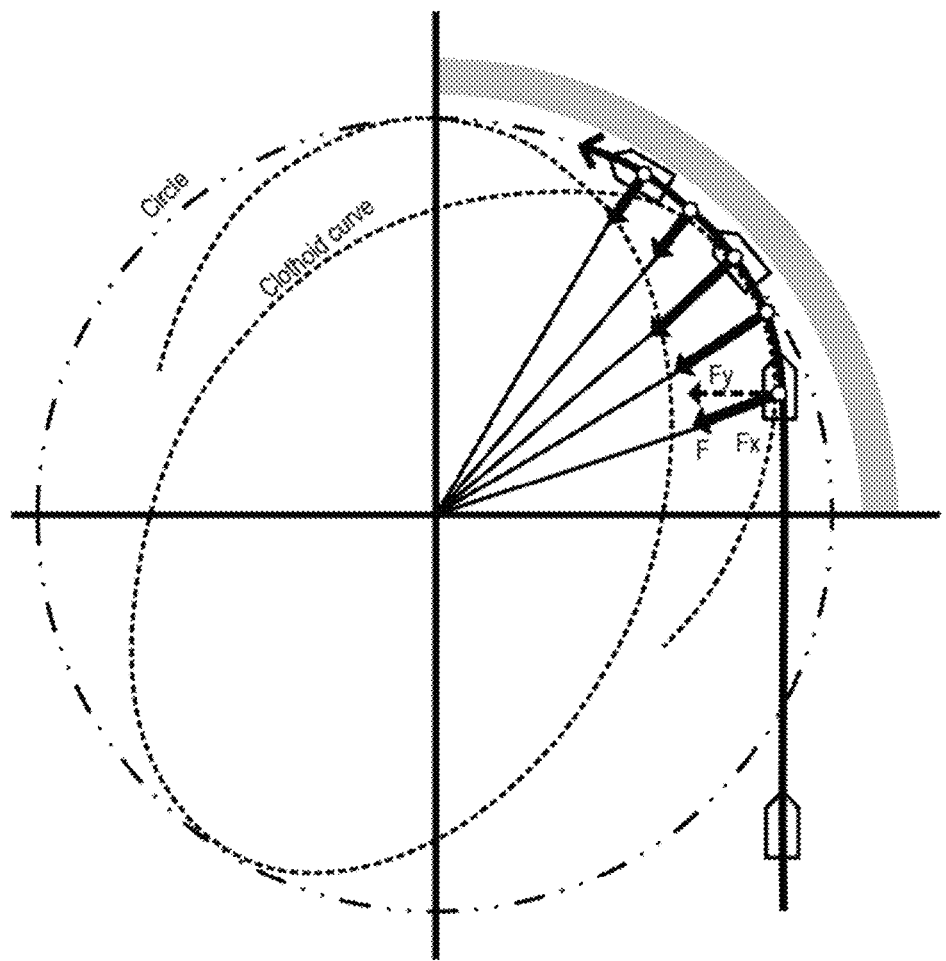
FIGS. 8 and 9 illustrate examples of circular virtual walls and repulsive force, which can be applied to a curved road, in accordance with an example implementation.
Figure 9:
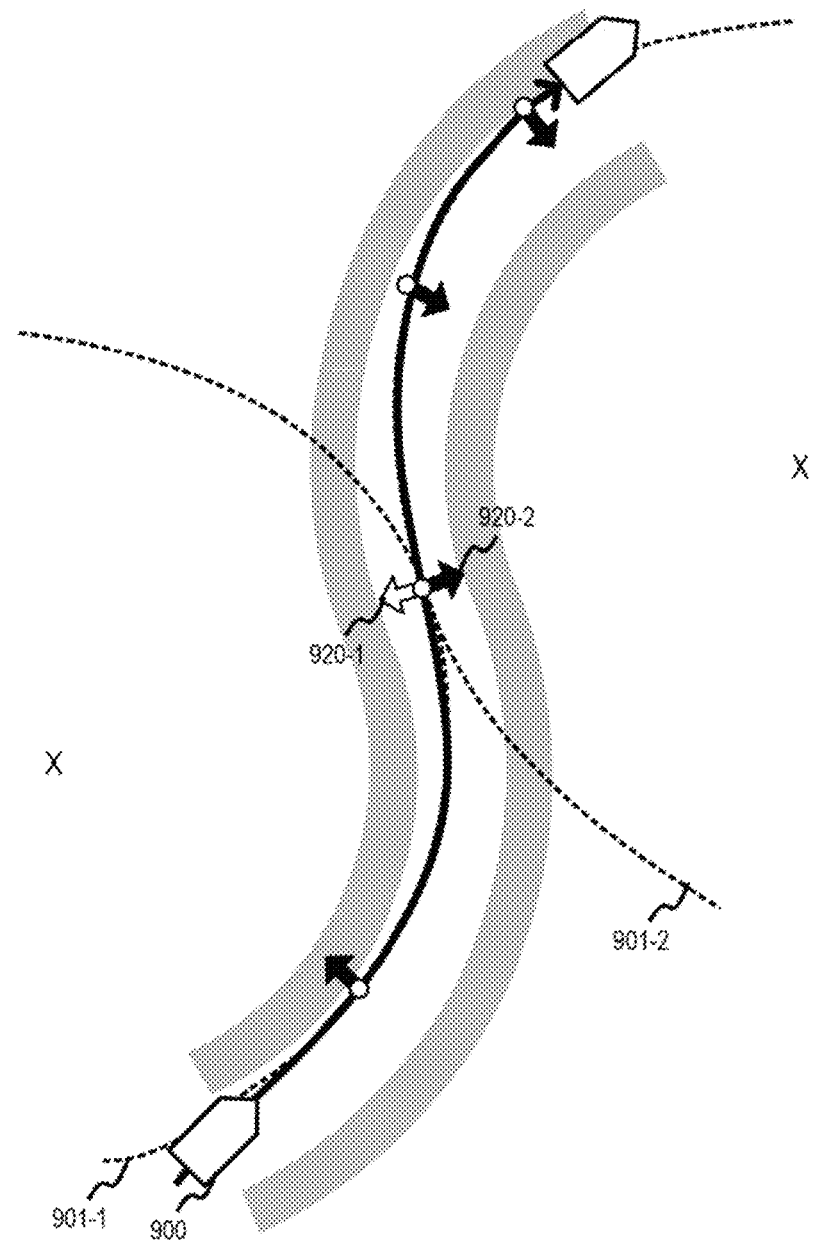

FIGS. 8 and 9 illustrate examples of circular virtual walls and repulsive force, which can be applied to a curved road, in accordance with an example implementation. When the virtual wall is a circle, the direction of repulsive force is toward the center of circle. In this case, the trajectory during the collision avoidance control can be a trochoid curve, such as a hypotrochoid curve.

In the example of FIG. 8, at the beginning of control both deceleration force Fx and lateral force Fy are activated to the vehicle. The deceleration force Fx decreases and the lateral force Fy increases during the collision control against the circular virtual wall. The deceleration force Fx will be zero and lateral force Fy will reach the same value as the absolute force which is constant during the control.

As a vehicle is controlled based on the repulsion force from the wall, the control threshold position can be calculated geometrically even for multi directional control on a 2D surface. Theoretically, the repulsion force control can minimize the distance between the wall and the threshold position when the absolute force is constant. The vehicle can be safe for collision against walls because the kinetic energy decreases due to the deceleration force. Furthermore, the direction change of force from deceleration to turning is natural for drivers because drivers usually decelerate before turning.

In the example of FIG. 9, if a vehicle 900 has to change the turning directions quickly, two directional repulsive forces 920-1, 920-2 and two line-symmetric and tangent trochoid curves 901-1, 901-2 are applied. When the vehicle 900 trace shifts the path from one trochoid 901-1 to another trochoid 901-2, which are line-symmetric and tangent to each other, the movement of the vehicle 900 changes continuously except for the direction of the repulsive force and acceleration. Thus, the velocity of the vehicle changes from the beginning to end of control as if the vehicle traces one trochoid. Therefore, the controller can calculate the threshold position and speed profile using the symmetric relation. The aspect ratio of the trochoid depends on the velocity and the direction and tangent point are depends on the two repulsive forces.

Figure 10A:
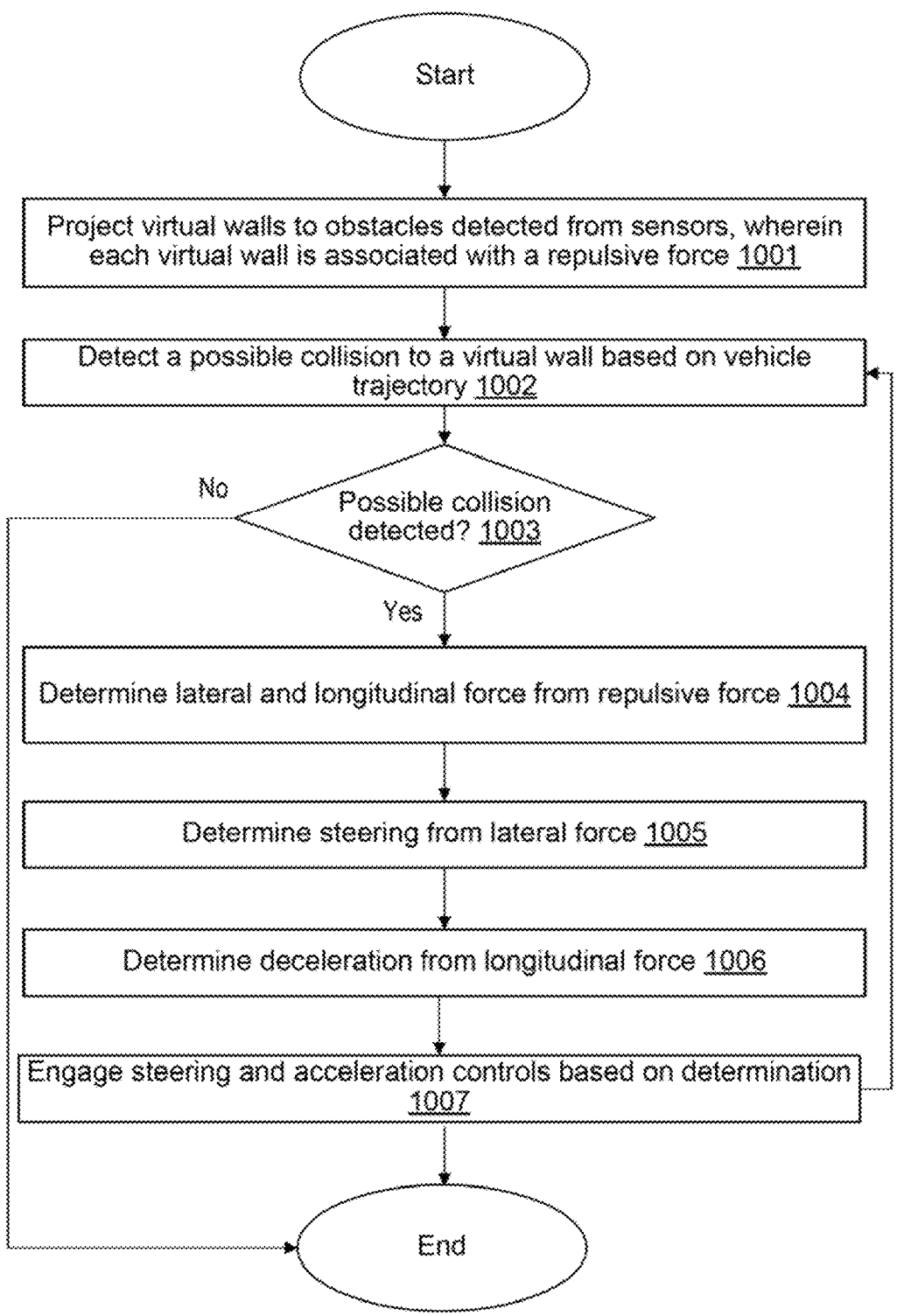
FIG. 10(a) illustrates an example flow for controlling a vehicle based on the projection of virtual walls on obstacles, in accordance with an example implementation.

FIG. 10(a) illustrates an example flow for controlling a vehicle based on the projection of virtual walls on obstacles, in accordance with an example implementation. At 1001, the process projects virtual walls to obstacles detected from sensors, wherein each virtual wall is associated with a repulsive force. The repulsive force can be set according to any desired implementation or function. For example, the repulsive force can be a set static value that is determined according to the desired safety threshold, can be set based on the obstacle, can be set according to a function based on the length of the virtual wall, or otherwise according to the desired implementation. The virtual wall can be projected to the obstacle according to the desired implementation.

For example, the virtual wall can be placed as a function in terms of f(vehicle speed, repulsive force, distance offset)= virtual wall (length, placement, angle). Further examples of such virtual wall projections are provided with respect to FIGS. 10(b) to 10(e).

At 1002, the process detects a possible collision to a virtual wall based on the vehicle trajectory. At 1003, a check is determined as to whether a possible collision is detected. The possible collision can be detected based on the vehicle trajectory, and also based on the threshold distance from the projected virtual wall. If a possible collision is detected due to the distance of the vehicle being within the threshold distance as well as the vehicle trajectory indicative of a collision with the virtual wall (Yes), then the flow proceeds to 1003, otherwise (No), the flow ends.

At 1004, the process then determines lateral and longitudinal force on the vehicle based on the repulsive force, as illustrated, for example, in the examples from FIG. 3 to FIG. 9. At 1005, the process can determine steering from the determined lateral force to avoid the virtual wall as illustrated in the examples from FIG. 3 to FIG. 9. At 1006, the process can determine deceleration for the vehicle based on the determined longitudinal force as illustrated in the examples from FIG. 3 to FIG. 9. At 1007, the process engages the steering and acceleration controls of the vehicle based on determination 1007, and then loops back to 1002.

Figure 10B:
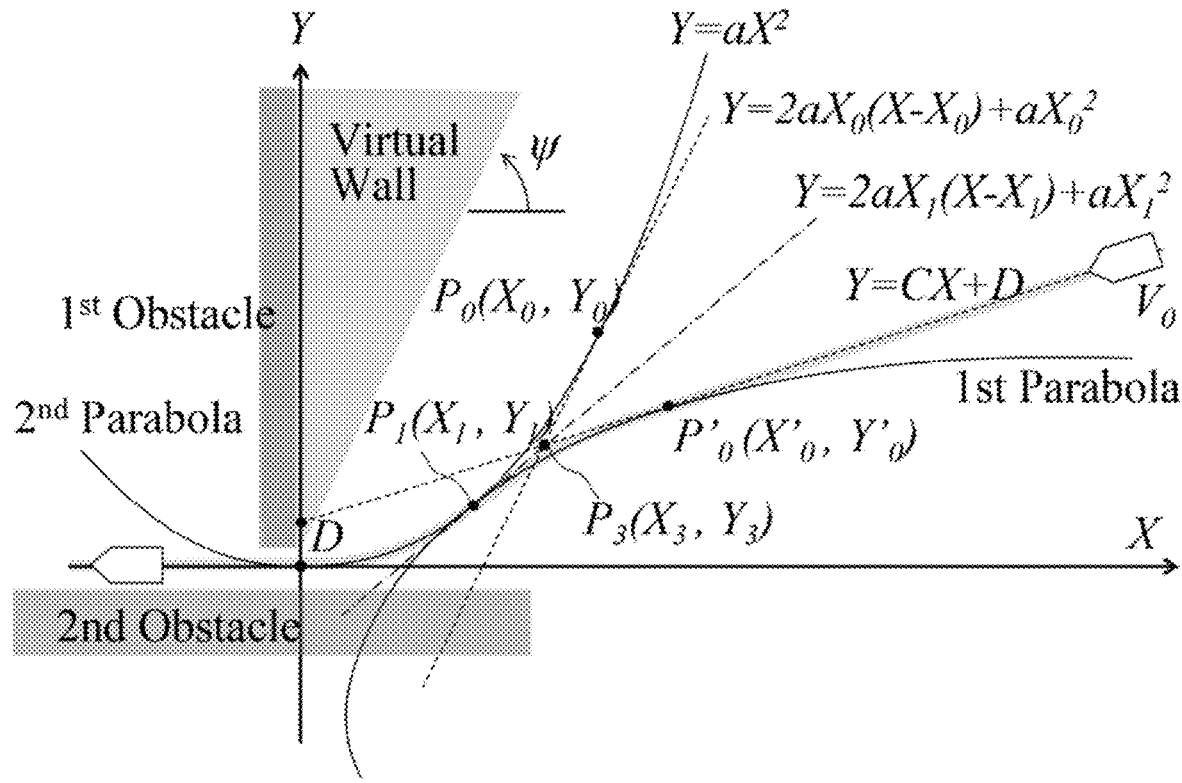
FIGS. 10(b) to 10(e) illustrate example functions for projecting a virtual wall, in accordance with an example implementation.
Figure 10C:
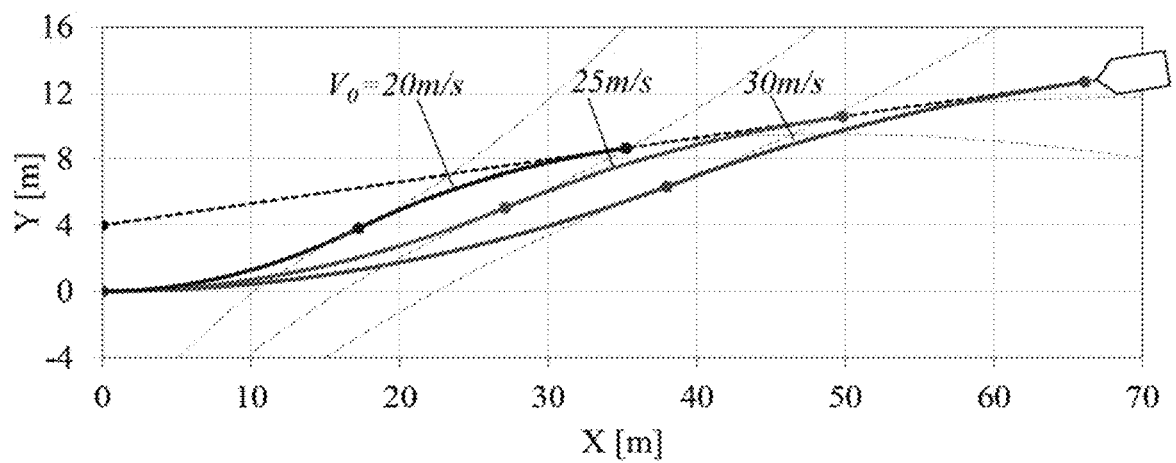

FIGS. 10(b) to 10(e) illustrate example functions for projecting a virtual wall, in accordance with an example implementation. Specifically, FIGS. 10(b) and 10(c) illustrate an example virtual wall projection function for a vehicle approach with an arbitrary angle. In such an example, the geometrical definition can be defined as illustrated in FIG. 10(b), wherein the approach condition of the vehicle is defined with an initial velocity of $V_0$, an approach path gradient C, and an offset D. For the escape condition, the quadratic formula for the $2^{nd}$ parabola as illustrated in FIG. 10(b) is defined as $Y=aX^2$.

As illustrated in FIG. 10(b), the following equations are defined:

$$E = 2aX_0 \quad (1)$$

$$X_1 = \frac{CX_0 + 2D}{2aX_0 - C} \quad (2)$$

$$X_1 = \frac{C\sqrt{1+E^2} + E\sqrt{1+C^2}}{2a(\sqrt{1+E^2} + \sqrt{1+C^2})} \quad (3)$$

$$X_0 = \sqrt{\frac{V_0^2}{2aG} - \frac{1}{4a^2}} \quad (4)$$

From the above four equations, a, $X_0$, and $X_1$ can be calculated. Then, the control start position $(X_0', Y_0')$ (threshold distance) can be defined as follows.

$$A = 2aX_1 \quad (5)$$

$$\begin{cases} X_0' = \frac{2aAX_0^2 + (1-A^2)X_0 + A^2X_1}{1+A^2} \\ Y_0' = \frac{a(A^2-1)X_0^2 + 2AX_0 - AX_1}{1+A^2} \end{cases}$$

From the above equations, the angle of the virtual wall is defined as $$\psi = 2 \times \tan^{-1}(2aX_1)) \quad (6)$$

FIG. 10(c) illustrates an example simulation result based on the implementation illustrated in FIG. 10(b), which can involve a path with a positive approaching angle (+7.5 degrees), at example $V_0$ of 20 m/s, 25 m/s and 30 m/s.

Figure 10D:
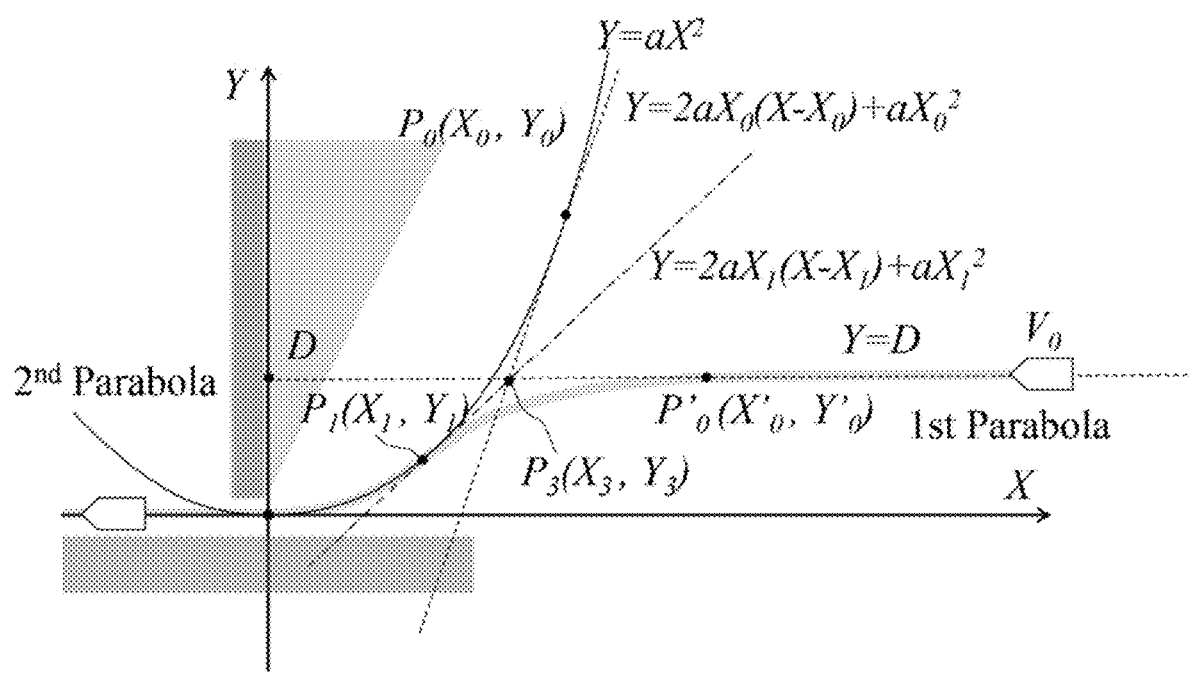
Figure 10E:
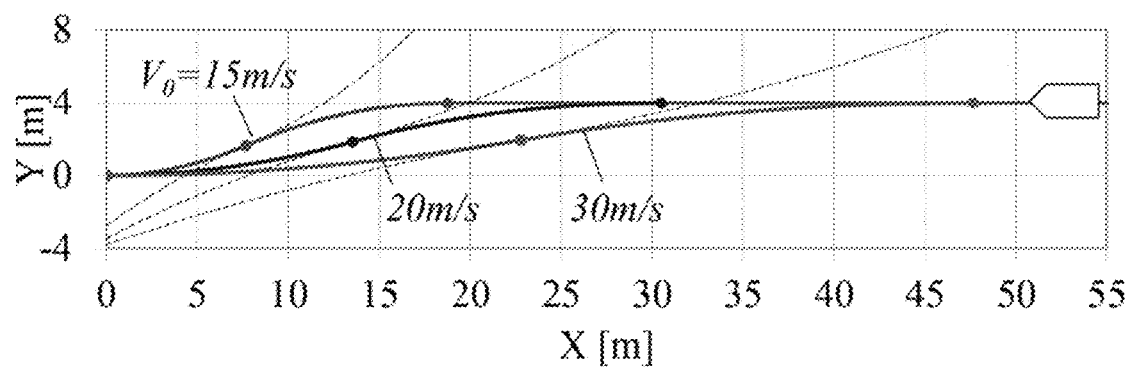

FIG. 10(d) illustrates an example projection of a virtual wall in a parallel shift situation, in accordance with an example implementation. When the vehicle is in a parallel shift, assume C=0. Then, as illustrated in FIG. 10(d), the following equations can apply:

$$X_1 = \frac{D}{aX_0} \quad (7)$$

$$X_0 = \sqrt{\frac{4aD^2 + 2D}{a}}$$

$$a = \frac{(L_a - 2D) \pm \sqrt{L_a(L_a - 4D)}}{8D},$$

$$\left(L_a = \frac{V_0^2}{2G}\right)$$

The control start position $(X_0', Y_0')$ (threshold distance) can be calculated according to equation (5). The angle of the first virtual wall can be determined by equation (6). An example simulation result of the parallel path situation is provided in FIG. 10(e), at example $V_0$ of 15 m/s, 20 m/s and 30 m/s.

Figure 11:
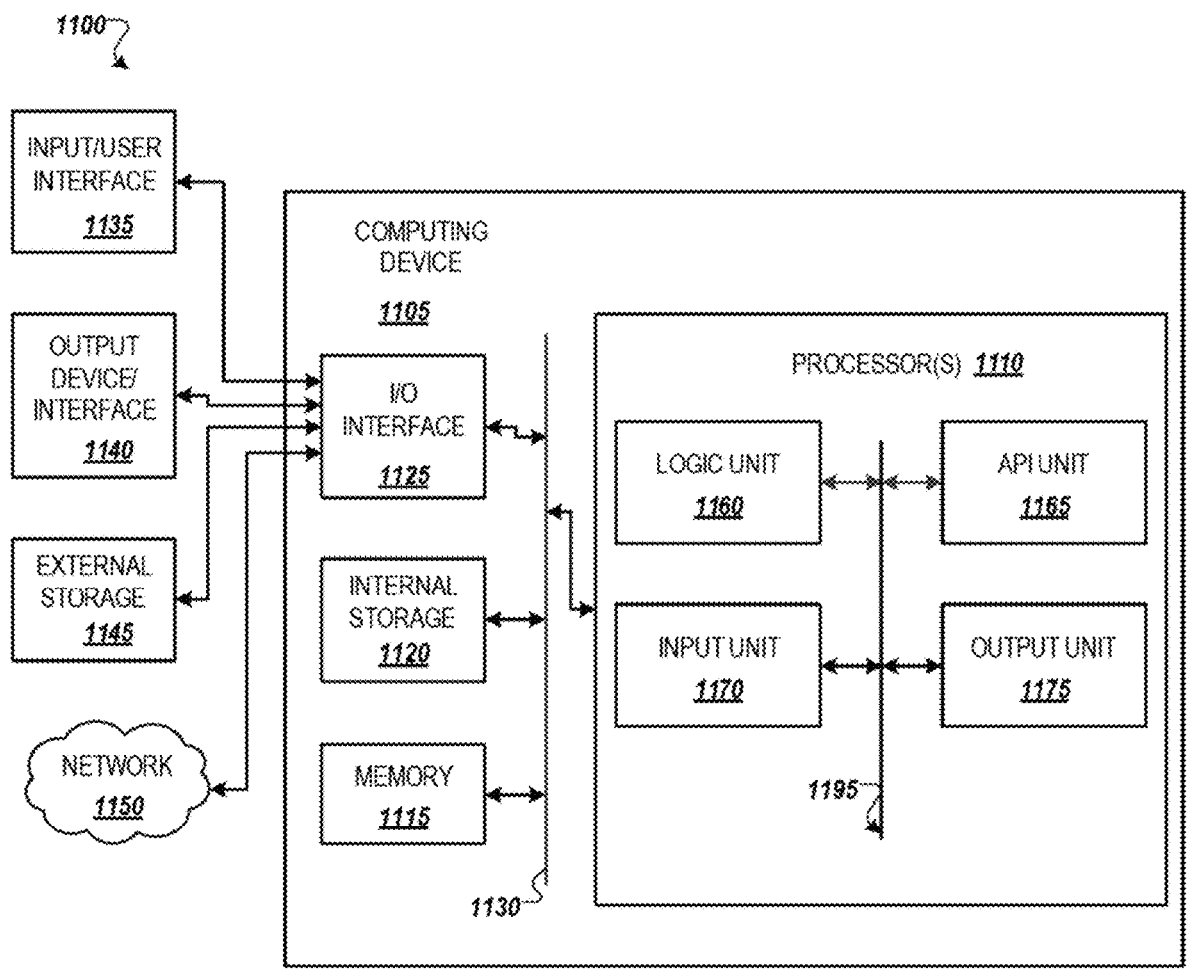
FIG. 11 illustrates an example computing environment with an example computer device suitable for use in some example implementations.

FIG. 11 illustrates an example computing environment with an example computer device suitable for use in some example implementations, such as a vehicle on board computer (OBD) or controller 1 configured to manage sensors from FIG. 2, or through any other implementation in accordance with the desired implementation.

Computer device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or I/O interface 1125, any of which can be coupled on a communication mechanism or bus 1130 for communicating information or embedded in the computer device 1105. I/O interface 1125 is also configured to receive images from cameras or provide images to projectors or displays, depending on the desired implementation.

Computer device 1105 can be communicatively coupled to input/user interface 1135 and output device/interface 1140. Either one or both of input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1140 may include a display, television, monitor, printer, speaker, braille, or the like. In some example implementations, input/user interface 1135 and output device/interface 1140 can be embedded with or physically coupled to the computer device 1105. In other example implementations, other computer devices may function as or provide the functions of input/user interface 1135 and output device/interface 1140 for a computer device 1105.

Examples of computer device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1105 can be communicatively coupled (e.g., via I/O interface 1125) to external storage 1145 and network 1150 for communicating with any number of networked components, devices, and systems, including one or more computer devices of the same or different configuration. Computer device 1105 or any connected computer device can be functioning as, providing services of, or referred to as a server, client, thin server, general machine, special-purpose machine, or another label.

I/O interface 1125 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computer device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1110 can execute under any operating system (OS) (not shown), in a native or virtual environment. One or more applications can be deployed that include logic unit 1160, application programming interface (API) unit 1165, input unit 1170, output unit 1175, and inter-unit communication mechanism 1195 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1165, it may be communicated to one or more other units (e.g., logic unit 1160, input unit 1170, output unit 1175). In some instances, logic unit 1160 may be configured to control the information flow among the units and direct the services provided by API unit 1165, input unit 1170, output unit 1175, in some example implementations described above. For example, the flow of one or more processes or implementations may be controlled by logic unit 1160 alone or in conjunction with API unit 1165. The input unit 1170 may be configured to obtain input for the calculations described in the example implementations, and the output unit 1175 may be configured to provide output based on the calculations described in example implementations.

Memory 1115 can be configured to store the value for the repulsive forces, the placement and lengths for one or more virtual walls projected onto each of the detected obstacles, and the determined curved paths derived from functions as described in the examples of FIG. 3 to FIG. 9.

Processor(s) 1110 can be configured to execute the flow as illustrated in FIG. 10 to project one or more virtual walls to one or more obstacles detected from sensors of a vehicle, wherein each of the one or more virtual walls is associated with a repulsive force. For the vehicle being within a threshold distance to a virtual wall of the one or more virtual walls and at a trajectory determined to collide with the virtual wall of the one or more virtual walls, processor(s) 1110 can be configured to derive a lateral force and a longitudinal force from the repulsion force of the virtual wall of the one or more virtual walls on the vehicle; determine steering control for the vehicle from the lateral force; determine deceleration control for the vehicle from the longitudinal force; and engage controls of the vehicle based on the steering control and the deceleration control as illustrated in FIG. 10(*a*).

In example implementations, the determining steering control for the vehicle from the lateral force comprises tracing one or more curved paths for the vehicle with the steering control from the lateral force as illustrated in the examples from FIG. 3 to FIG. 9.

In the example implementations, the one or more curved paths comprises at least one of a parabolic path and a trochoidal path as illustrated in the examples from FIG. 3 to FIG. 9.

In the example implementations, the one or more curved paths can involve at least two curved paths, each of the at least two curved paths being at least one of a line-symmetric parabolic path and a line-symmetric trochoidal path, wherein the at least two curved paths are tangent to each other as illustrated in examples from FIGS. 5 to 9.

In the example implementations, the deceleration force can change continuously at a joint of each of the one or more curved paths as illustrated, for example, in FIG. 6.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   projecting one or more virtual walls to one or more obstacles detected from sensors of a vehicle, wherein each of the one or more virtual walls is associated with a repulsive force;
   for the vehicle being within a threshold distance to a virtual wall of the one or more virtual walls and at a trajectory determined to collide with the virtual wall of the one or more virtual walls:
   deriving a lateral force and a longitudinal force from the repulsive force of the virtual wall of the one or more virtual walls on the vehicle;
   determining steering control for the vehicle from the lateral force;
   determining deceleration control for the vehicle from the longitudinal force; and
   engaging controls of the vehicle based on the steering control and the deceleration control to change the trajectory of the vehicle to avoid the virtual wall of the one or more virtual walls.

2. The method of claim 1, wherein the determining the steering control for the vehicle from the lateral force comprises tracing one or more curved paths for the vehicle with the steering control from the lateral force.

3. The method of claim 2, wherein the one or more curved paths comprises at least one of a parabolic path and a trochoidal path.

4. The method of claim 2, wherein the one or more curved paths comprises at least two curved paths, each of the at least two curved paths being at least one of a line-symmetric parabolic path and a line-symmetric trochoidal path, wherein the at least two curved paths are tangent to each other.

5. The method of claim 2, wherein the deceleration force changes continuously at a joint of each of the one or more curved paths.

6. The method of claim 1, wherein the projecting the one or more virtual walls to the one or more obstacles detected from the sensors of the vehicle is conducted based on vehicle speed, repulsive force, and distance offset.

7. An on board computer (OBC) for a vehicle, comprising:
   a processor, configured to:
      project one or more virtual walls to one or more obstacles detected from sensors of the vehicle, wherein each of the one or more virtual walls is associated with a repulsive force;
      for the vehicle being within a threshold distance to a virtual wall of the one or more virtual walls and at a trajectory determined to collide with the virtual wall of the one or more virtual walls:
      derive a lateral force and a longitudinal force from the repulsive force of the virtual wall of the one or more virtual walls on the vehicle;
      determine steering control for the vehicle from the lateral force;
      determine deceleration control for the vehicle from the longitudinal force; and
      engage controls of the vehicle based on the steering control and the deceleration control to change the trajectory of the vehicle to avoid the virtual wall of the one or more virtual walls.

8. The OBC of claim 7, wherein the processor is configured to determine the steering control for the vehicle from the lateral force comprises tracing one or more curved paths for the vehicle with the steering control from the lateral force.

9. The OBC of claim 8, wherein the one or more curved paths comprises at least one of a parabolic path and a trochoidal path.

10. The OBC of claim 8, wherein the one or more curved paths comprises at least two curved paths, each of the at least two curved paths being at least one of a line-symmetric parabolic path and a line-symmetric trochoidal path, wherein the at least two curved paths are tangent to each other.

11. The OBC of claim 8, wherein the deceleration force changes continuously at a joint of each of the one or more curved paths.

12. The OBC of claim 7, wherein the processor is configured to project the one or more virtual walls to the one or more obstacles detected from the sensors of the vehicle based on vehicle speed, repulsive force, and distance offset.

13. A vehicle, comprising:
a plurality of sensors; and
a processor, configured to:
project one or more virtual walls to one or more obstacles detected from the plurality of sensors, wherein each of the one or more virtual walls is associated with a repulsive force;
for the vehicle being within a threshold distance to a virtual wall of the one or more virtual walls and at a trajectory determined to collide with the virtual wall of the one or more virtual walls:
derive a lateral force and a longitudinal force from the repulsive force of the virtual wall of the one or more virtual walls on the vehicle;
determine steering control for the vehicle from the lateral force;
determine deceleration control for the vehicle from the longitudinal force; and
engage controls of the vehicle based on the steering control and the deceleration control to change the trajectory of the vehicle to avoid the virtual wall of the one or more virtual walls.

14. The vehicle of claim 13, wherein the processor is configured to determine steering control for the vehicle from the lateral force comprises tracing one or more curved paths for the vehicle with the steering control from the lateral force.

15. The vehicle of claim 14, wherein the one or more curved paths comprises at least one of a parabolic path and a trochoidal path.

16. The vehicle of claim 14, wherein the one or more curved paths comprises at least two curved paths, each of the at least two curved paths being at least one of a line-symmetric parabolic path and a line-symmetric trochoidal path, wherein the at least two curved paths are tangent to each other.

17. The vehicle of claim 14, wherein the deceleration force changes continuously at a joint of each of the one or more curved paths.

18. The vehicle of claim 13, wherein the processor is configured to project the one or more virtual walls to the one or more obstacles detected from the plurality of sensors based on vehicle speed, repulsive force, and distance offset.

* * * * *